United States Patent [19]
Jornod

[11] 4,107,700
[45] Aug. 15, 1978

[54] FANFOLD PAPER TRANSPORT

[75] Inventor: Eugene R. Jornod, Caledonia, Ill.

[73] Assignee: Barber-Colman Company, Rockford, Ill.

[21] Appl. No.: 728,722

[22] Filed: Oct. 1, 1976

[51] Int. Cl.² .......................................... G01D 15/30
[52] U.S. Cl. ................... 346/76 R; 400/613.2; 226/118; 270/61 F; 346/136
[58] Field of Search ............ 346/136, 76 R; 226/118; 197/133 F; 270/61 F

[56] References Cited

U.S. PATENT DOCUMENTS

| | | | |
|---|---|---|---|
| 2,282,561 | 5/1942 | Callahan | 346/92 |
| 3,123,269 | 3/1964 | Morley | 226/118 |
| 3,188,080 | 6/1965 | Kelliher | 270/61 F |
| 3,229,301 | 1/1966 | Polster et al. | 346/136 X |
| 3,360,799 | 12/1967 | Polster | 346/29 |
| 3,712,607 | 1/1973 | Ziegler | 270/61 F |
| 3,864,694 | 2/1975 | Tamura | 346/136 |
| 3,871,763 | 3/1975 | Schrempp | 226/118 |

Primary Examiner—Joseph W. Hartary
Attorney, Agent, or Firm—A. Richard Koch

[57] ABSTRACT

Fanfold paper is progressively withdrawn from the bottom of a container, fed past a printing mechanism, transported upwardly and deposited in fanfold configuration at the top of the container.

9 Claims, 12 Drawing Figures

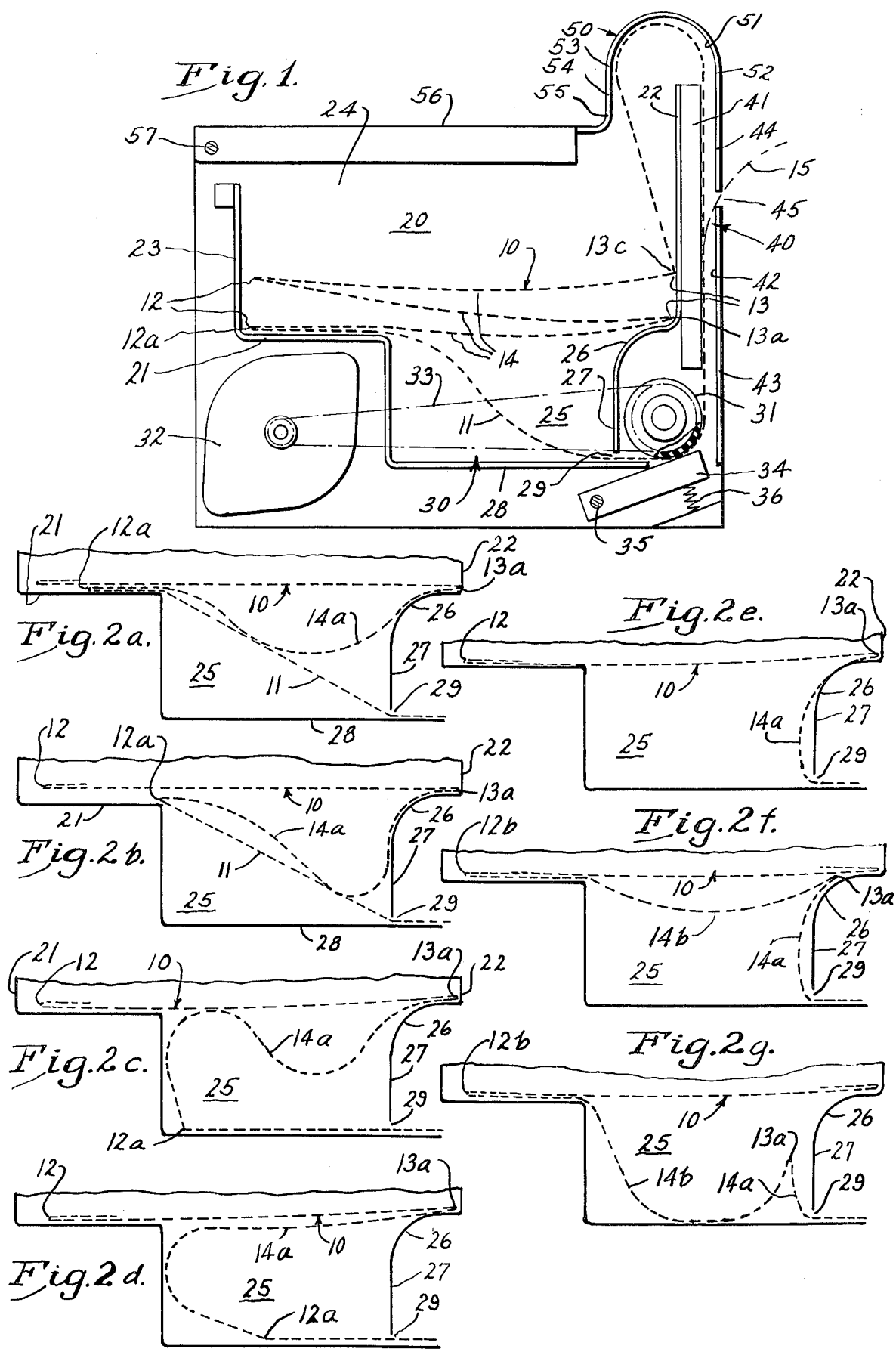

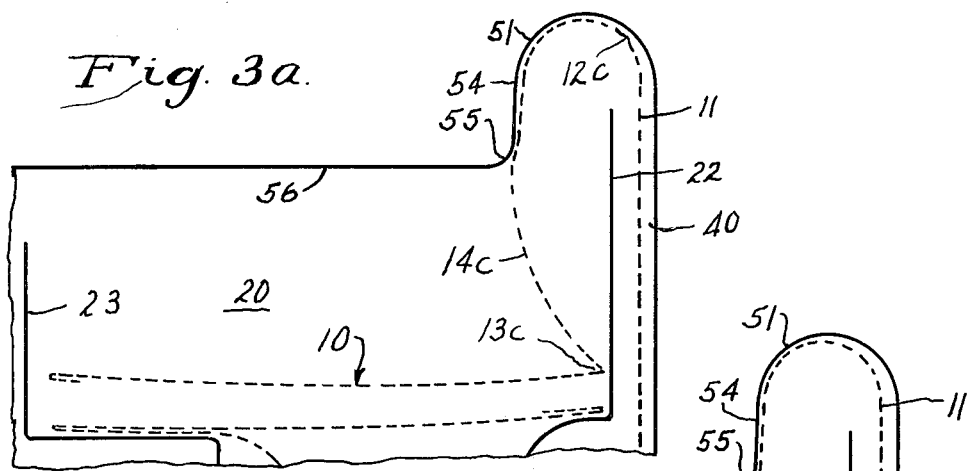
Fig. 3a.
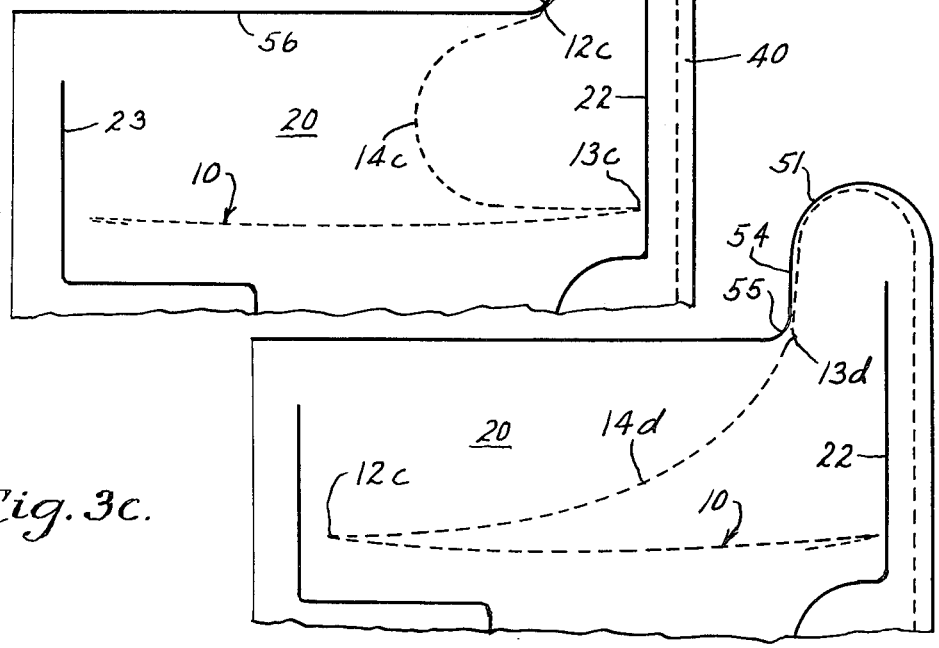
Fig. 3b.
Fig. 3c.
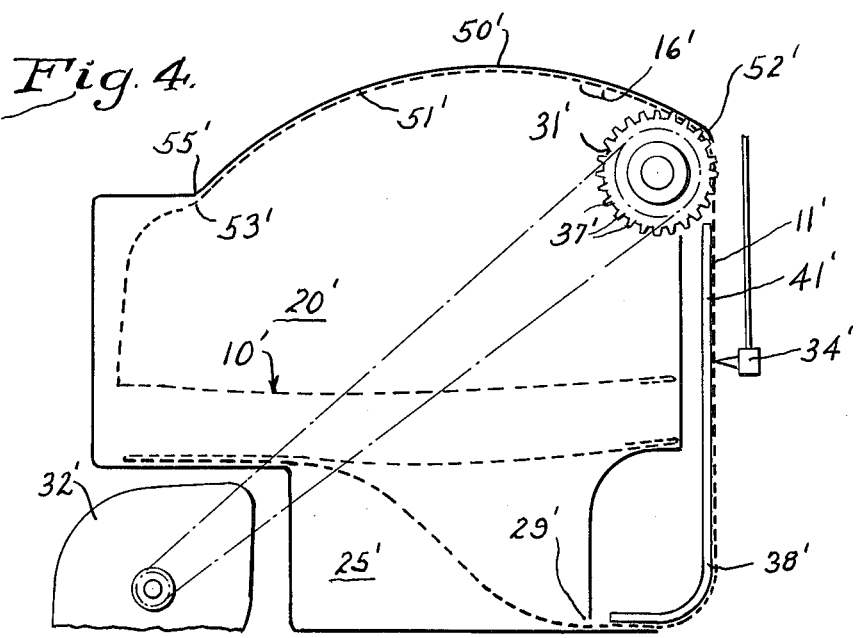
Fig. 4.

FANFOLD PAPER TRANSPORT

BACKGROUND OF THE INVENTION

Recorders on fanfolded strips have presented a problem concerning what disposition is to be made of the strip after the record has been made thereon. One common solution is merely to provide a receptacle under the recorder to collect the strip as disclosed in the Woolley patent No. 2,446,400. In such recorders the strip is fed in from the top so the resulting record is read from the bottom up rather than the more conventional from the top down. This may be confusing to anyone not acquainted with this characteristic. Woolley also discloses apparatus in which fanfolded strip in a supply container is progressively withdrawn, fed upwardly past a recording device and deposited in a separate container adjacent said supply container in fanfold fashion.

SUMMARY OF THE INVENTION

According to the present invention, fanfold paper is stacked vertically in a container, withdrawn progressively from the bottom of the container, passed by a recording station and returned to the top of said container where it automatically resumes its fanfolded configuration. Only one container is required. Since the paper withdrawn from the container is subsequently returned to the same container, the container may be of minimum volume.

BRIEF DESCRIPTION OF THE DRAWINGS

FIG. 1 is a side view of a fanfold paper transport according to this invention with the near side removed.

FIG. 2 a-g show shapes taken by the paper being withdrawn from a pack in FIG. 1.

FIG. 3 a-c show shapes taken by the paper being returned to the pack in FIG. 1.

FIG. 4 is a side view of a modified fanfold paper transport with the near side removed.

DESCRIPTION OF THE PREFERRED EMBODIMENT

As seen in FIG. 1, a pack 10 of fanfold paper is confined substantially horizontally in a receptacle 20, through the bottom 21 of which a strip 11 of paper is progressively withdrawn from the pack by means 30, shown as comprising a feed roll 31. The strip is directed upwardly, as through a channel 40, to a guide 50 that deflects the strip backwardly and downwardly into the receptacle above the pack, such that the strip automatically resumes the fanfolded configuration.

The strip 11 of paper is usually perforated across its width at regular spaced intervals along its length to weaken the strip at such perforations and thus determine where alternate oppositely bent folds 12, 13 occur in its fanfolded configuration. The sheets 14 of paper between the folds lie one above another in the pack 10 with folds 12 in one plane perpendicular to the flat sheets and with folds 13 in a parallel plane. In the particular embodiment described, the transport is part of a printing recorder employing a thermal printhead 34, so the paper must be a special type that turns color upon application of heat.

In addition to bottom 21, receptacle 20 comprises a front end 22 and a back end 23 spaced apart sufficiently to provide clearance for the length of sheets 14. Side 24 and the removed side of the paper transport are spaced apart sufficiently to provide clearance for the width of sheets 14 and to restrict sideways movement of the sheets comprising the pack 10. A recess 25 in the bottom 21 extends from wall to wall intermediate the ends 22, 23. The bottom 21 near the front end 22 has a concave downward curve 26 into the recess 25 and terminating in a substantially vertical wall 27, the free end of which is spaced narrowly from the lower bound 28 of the recess to leave a feed slot 29 for the strip 11.

The withdrawal means 30 comprises a feed roll 31 with a rubber, or the like, surface having a high coefficient of friction with the strip 11. The roll is driven by a motor 32 through a cogged belt 33, or the like, in continuous or stepped fashion. The strip 11 is held in frictional engagement with the roll by a thermal printhead 34 employed to record information on the strip. The printhead is pivoted at one end on a pin 35 and has its printing end in contact with strip 11 and biased toward the roll as by spring 36.

The channel 40 is formed by a back plate 41 and a transparent front plate 42 spaced apart to permit passage of the strip 11 therebetween without buckling, the side 24 and the side removed from the paper transport. In this embodiment the front plate is divided into a lower plate 43 and an upper plate 44 in longitudinal alignment and spaced from each other to form an exit slot 45 through which some portion 15 of the strip may be removed from the paper transport, if desired. As shown, the upper plate is attached to the guide 50 and is movable therewith, as later described.

The guide 50 comprises a concave downward curved surface 51 having an entry end 52 positioned above the channel 40 such that strip 11 moving upward through the channel will engage the concave surface. As shown, the upper front plate 44 of the channel is an extension on the entry end. The curve takes the form of a semicylindrical surface and terminates at an exit end 53 with a downwardly depending vertical extension 54, which is, in turn, connected at a guide end 55 to a cover 56 pivoted about a shaft 57.

FIG. 1 shows a strip 11 in what may be considered as the starting position with the lowest fold 12a in pack 10 in alignment with the other folds 12 in the pack and with the strip extending therefrom through recess 25 and out through feed slot 29 in a gentle compound curve. The strip, being pressed into frictional engagement with feed roll 31 by the printhead 34, is withdrawn from the pack by rotation of the feed roll. As the strip is progressively widthdrawn, the fold 12a is pulled to the right along the bottom 21. This movement shortens the distance between fold 12a and the lowest fold 13a pressed against front end 22, causing the sheet 14a between them to buckle as seen in FIG. 2a. The buckling continues with the sheet 14a following generally the curve 26 and vertical wall 27 on the right and strip 11 on the left until the sheet will make no sharper bend between these portions and the sheet leaves the curve 26 and uppermost portion of strip 11 until as the fold 12a is ready to enter recess 25, the sheet takes the configuration shown in FIG. 2b. When the fold 12a falls into recess 25, sheet 14a assumes the shape shown in FIG. 2c, and later fills the recess with a simple curve as seen in FIG. 2d. The length of the simple curve is progressively reduced until, as illustrated in FIG. 2e, the fold 13a begins to be drawn away from front end 22. As fold 13a is drawn further away from the front end, the next sheet 14b begins to buckle as the distance between folds 13a and 12b, against back end 23 is shortened, as shown in FIG. 2f, after which sheet 14a loses contact with curve 26 and assumes the position seen in FIG. 2g. The cusp formed by fold 13a is progressively flattened until the strip returns to the configuration of FIG. 2a. The recess 25 must be large enough to accommodate these contortion of the strip 11. Because folds 13 are pulled away from the front end 22 in the opposite direction from the direction in which the strip 11 is withdrawn from the recess, a great deal of friction is encountered. For this reason there is little, if any, flat in the bottom 21 at the front end. Because folds 12 are pulled in the same direction as the strip 11, a long flat surface is acceptable at the back end.

Again using FIG. 1 as a starting point, with a fold 13c at the top of pack 10 restrained against the front end 22, channel 40 prevents the strip 11 from buckling as it is pushed upward by feed roll 31 against curve 51, which passively deflects the strip backwards and downwards into the receptacle 20 above the pack and spaced from the front end. A sheet 14c, between folds 13c and 12c, as seen in FIG. 3a, is bent concave downward by its own weight and by the downward thrust exerted at the guide end 55. When fold 12c reaches the guide end, as seen in FIG. 3b, the resilience and weight of the sheet cause it to lie down on top of the pack, bringing fold 12c into alignment with other folds 12. The location of guide end 55 is such that, as more strip 11 is fed upwards, the guide end 55 forces a portion of the succeeding sheet 14d to assume a concave upward curvature, as seen in FIG. 3c, whereafter the sheet 14d begins to lie down on the pack beginning at fold 12c and continuing until the fold 13d at the other end of sheet 14d is resting on the pack, at which time another cycle begins.

FIG. 4 shows another embodiment disclosing a number of modifications. The same reference numerals are used where applicable, but with primes to distinguish them. A feed roll 31', having spaced studs 37' around its periphery to engage similarly spaced apertures 16' in a strip 11', pulls the strip upward along a platen 41' so that a recording means, shown as a pen 34', may mark the strip. A turning means 38' enables the strip to change direction between a feed slot 29' and the platen 41'. A guide 50' comprises only a curved portion 51', having an entry end 52' adjacent the roll 31' to receive the strip 11' therefrom and an exit end 53' coinciding with the guide end 55'.

It will be obvious to those skilled in the art that many other modifications and substitutions may be made. The preferred embodiment is only an example of the invention, which is defined by the claims.

I claim:

1. A fanfold strip transport comprising a substantially horizontal receptacle having a bottom, sides, and front and back ends for confining a flexible strip in a fanfolded pack configuration, a recess in the bottom of said receptacle intermediate the ends, a feed roll adjacent said recess for progressively withdrawing said strip through the recess, a channel adjacent said front end for directing upwardly the withdrawn strip, and a guide for deflecting said upwardly directed strip backwardly and downwardly into the receptacle at a location such that said strip automatically resumes the fanfolded pack configuration.

2. A fanfold strip transport according to claim 1 wherein said directing channel comprises front and back portions spaced to prevent buckling of the upwardly directed strip of paper.

3. A fanfold strip transport according to claim 2 wherein the front of said directing channel is substantially devoid of visual obstruction.

4. A fanfold strip transport according to claim 1 wherein said guide comprises a concave downward curved surface.

5. A fanfold strip transport according to claim 4 wherein said curved surface is substantially semi-cylindrical.

6. A fanfold strip transport according to claim 5 wherein said guide further comprises a substantially vertical downward extension to the curved surface remote from said channel.

7. A fanfold strip transport according to claim 4 wherein said guide comprises an end located to produce a concave upward curve in each sheet of said strip during entry of the respective sheets into the receptacle.

8. A fanfold strip transport according to claim 1 further comprising means for biasing said strip into frictional engagement with the feed roll, said biaisng means comprising a thermal print head.

9. A fanfold strip transport according to claim 1 wherein the bottom of said receptacle at the front end curves downwardly into said recess, said downward curve terminating in a substantially vertical wall of said recess, a lower end of said wall spaced narrowly above a lower bound of the recess to leave a slot for passage of said strip from the recess.

* * * * *